United States Patent [19]
Roberts et al.

[11] Patent Number: 5,499,785
[45] Date of Patent: Mar. 19, 1996

[54] AUTOJETTISON METHOD AND APPARATUS FOR DUAL-POINT SUSPENSION SYSTEMS

[75] Inventors: James P. Roberts, Claymont; James D. Culp, Newark, both of Del.; David G. Miller, Philadelphia, Pa.; Martin R. Sarsfield, Wilmington, Del.

[73] Assignee: The Boeing Company, Seattle, Wash.

[21] Appl. No.: 306,745

[22] Filed: Sep. 15, 1994

[51] Int. Cl.⁶ ................................................. B64D 1/12
[52] U.S. Cl. ..................... 244/137.4; 244/137.1; 244/118.1; 244/2; 244/3
[58] Field of Search .................... 244/137.1, 137.4, 244/118.1, 2, 3; 294/82.26, 82.29

[56] References Cited

U.S. PATENT DOCUMENTS

| | | | |
|---|---|---|---|
| 3,690,602 | 9/1972 | Marsh | 244/137 R |
| 3,721,408 | 3/1973 | Drew et al. | 244/139 |
| 3,747,877 | 7/1973 | Drew | 244/139 |
| 3,904,156 | 9/1975 | Smith | 244/3 |
| 3,946,971 | 3/1976 | Chadwick | 244/137 R |
| 3,957,233 | 5/1976 | Adams | 244/137 R |
| 3,957,234 | 5/1976 | Mulvey et al. | 244/137 R |
| 4,076,435 | 2/1978 | Gueldner | 244/3 |
| 4,127,245 | 11/1978 | Tefft et al. | 244/17.13 |
| 4,275,992 | 6/1981 | Andrews et al. | 416/146 R |
| 4,346,862 | 8/1982 | Richburg | 244/137 R |
| 4,447,674 | 5/1984 | Grantland et al. | 179/81 R |
| 5,145,227 | 9/1992 | Monford, Jr. | 294/65.5 |
| 5,190,250 | 3/1993 | DeLong et al. | 244/137.1 |
| 5,273,333 | 12/1993 | Hatfield et al. | 294/82.3 |

Primary Examiner—Andres Kashnikow
Assistant Examiner—Tien Dinh
Attorney, Agent, or Firm—Christensen, O'Connor Johnson & Kindness

[57] ABSTRACT

A method and apparatus for automatically jettisoning cargo carried by a dual-point suspension system when a suspension system failure is detected. Three conditions must be satisfied before a load is jettisoned. The average value of the load and an instantaneous value of the load on a hook must have fallen below a threshold value (zero load condition). A threshold amount of the load must have shifted from one hook to the other (dynamic load split condition). A threshold amount of an initial hook load must have been lost within a short period of time (rapid rate-of-decrease condition). For all three conditions, the threshold amount or value is adaptively set based on the actual load carried by the dual-point suspension. If all three conditions are satisfied for either the forward or the aft hook, the cargo is jettisoned. Additionally, a fourth condition that detects whether a structural limit of a hook has been exceeded is evaluated. If the structural limit has been exceeded, the load is jettisoned.

39 Claims, 8 Drawing Sheets

AUTOJETTISON METHOD AND APPARATUS FOR DUAL-POINT SUSPENSION SYSTEMS

FIELD OF THE INVENTION

This invention relates generally to mechanisms for carrying cargo suspended beneath an aircraft, and more specifically to a method and apparatus for automatically jettisoning the cargo carried by a dual-point suspension system.

GOVERNMENT RIGHTS

This invention was made with government support under Contract No. N00019-93-C-0006, awarded by the Department of Defense (Navy). The government has certain rights in this invention, including the right in limited circumstances to require the patent owner to license others under reasonable terms.

BACKGROUND OF THE INVENTION

Helicopters, tiltrotor, and other vertical take-off aircraft (hereinafter collectively referred to as "aircraft") are often called upon to move large cargo into areas that are not readily accessible to land vehicles. When moving particularly large or heavy pieces of cargo, the cargo is usually suspended beneath the aircraft by a set of slings that connect the load created by the cargo to one or two attachment points located on the bottom of the aircraft. While the number of the attachment points and the design of the attachment points may vary, they typically take the form of a hook from which the cargo is suspended. The hooks are remotely operable to allow the cargo that is being carried to be released from the cockpit. Suspending the cargo beneath the helicopter allows the cargo to be quickly loaded or unloaded without forcing the aircraft to land.

When ferrying a heavy load beneath an aircraft at high speeds, it has been found to be advantageous to suspend the cargo from two attachment points rather than a single attachment point. A dual-point suspension distributes the weight of the cargo more evenly, allowing heavier cargo to be carried by the aircraft. A dual-point suspension that has a first attachment point positioned at the front of the aircraft and a second attachment point positioned at the rear of the aircraft also provides directional stability when flying. Keeping the cargo oriented parallel with the aircraft's direction of travel reduces the tendency of the cargo to spin or twist during flight.

While it is desirable to carry cargo suspended from two attachment points, a dual-point suspension generates problems that are not present with a single attachment point. When a component of a single-point suspension system fails, the aircraft is typically not placed in any danger. For example, a failure of a sling connecting cargo to a single attachment point on an aircraft would merely drop the load to the ground. Although the cargo would be lost, the failure of the single-point suspension system would not generally pose a danger to the aircraft.

In contrast, a failure in a dual-point suspension system may potentially harm the aircraft that is carrying cargo. At least two different types of failures may arise when cargo is carried by a dual-point suspension. A component of the suspension system itself may fail. For example, a hook may break or a sling from one of the hooks may become severed or disconnected from the cargo. A failure of one of the attachment points transfers the entire cargo load onto the sole remaining hook. Alternatively, the cargo being carried may break into several different pieces due to the rigors of flight or by collision with another object. Cargo breaking into pieces results in a portion of the original cargo being suspended from each hook. If the cargo breaks into substantially unequal pieces, the load on one hook will lessen, while the load on the other hook will increase. Either type of suspension system failure could potentially harm the ferrying aircraft. Portions of the cargo may swing up and physically strike the aircraft, or the weight shift caused by a failure of an attachment point could induce an instability in the flight characteristics of the aircraft. When a component of a dual-point suspension system fails, or when cargo breaks into pieces, it is therefore the best course of action to drop the cargo as quickly as possible. Jettisoning the cargo is the preferred alternative to potentially damaging the aircraft carrying the cargo.

Accurately determining when a portion of a dual-point suspension system fails is therefore critical to carrying any cargo by a two point suspension. Previous systems for determining when a dual-point suspension system fails rely on detecting when the load on a hook falls below a minimum value for a period of time. To detect the load placed on each hook, load cells are typically built into the hooks. The load cells control the magnitude of an electrical signal such that the magnitude is proportional to the amount of the load supported by the hook. The load cell signals are periodically sampled in order to provide an accurate measure of the amount of the load supported by each hook at a given point in time. Prior art systems use the load cell data to determine when a hook load drops below a minimum value for a short period of time. When this occurs, the cargo is jettisoned. For example, in one prior art system used on a CH53E Sea Stallion, if the load on a hook falls below 300 pounds for greater than 0.15 seconds, the cargo being carried is automatically jettisoned.

In ideal flight conditions, the prior art method of detecting a dual-point suspension failure and automatically jettisoning the cargo works reasonably well. However, false alarms and detection failures often occur in actual flight conditions. False alarms are typically created by the motion of the aircraft. Those skilled in the art will recognize that the load borne by each hook of a dual-point suspension system will rarely be constant during flight. The trajectory of the aircraft, including its speed, rate of turning, and rate of altitude gain or loss, will all affect the load supported by each hook of the suspension system. Turbulence will often cause the cargo to exert a varying force on each attachment point. When an aircraft maneuvers at low Gs or encounters turbulence, cargo may bounce, resulting in a false indication of a suspension point failure. The prior art system of detecting suspension failures therefore generates false alarms in certain circumstances.

The prior art system of detecting a dual-point suspension system failure also fails to detect many actual failures. Detection failures can occur when cargo suspended from a dual-point suspension system breaks apart. If cargo separates into two pieces, leaving more than the minimum jettison load value hanging from each hook of the system, prior art systems will not detect the failure and, as a result, not jettison the cargo. In summary, detecting a dual-point suspension failure by determining when the loads on the hooks drop below a minimum value for a period of time has proven to be inadequate because false alarms are generated and failures are not always detected. The present invention is directed to providing a method and apparatus for detecting suspension or load failure that overcomes these disadvantages.

SUMMARY OF THE INVENTION

In accordance with this invention, a method and apparatus for detecting either a suspension or a load failure in a dual-point suspension system and automatically jettisoning cargo when such a failure occurs is provided. As noted above, a standard dual-point suspension system includes two hooks or other attachment mechanism positioned beneath an aircraft for carrying cargo suspended by slings. The preferred versions of the invention evaluate three conditions to determine if a suspension or load failure has occurred. First, a zero load condition is evaluated to determine if the load on a particular hook has fallen below a threshold level. The zero load condition exists if the instantaneous load on a hook and the average load on a hook are both below the threshold level. Preferably, the threshold level is adaptively set at a percentage of the prefailed load on that hook, limited by a minimum value. Because the threshold of the zero load condition is adaptively set, the condition provides a more accurate measurement of suspension failure for many sizes and weights of loads.

Second, the method and apparatus of the invention determines if a dynamic load split condition exists. A dynamic load split condition exists if a rapid transfer of load from one hook to the other has occurred. This is a salient feature of an actual hook or sling failure. The system monitors the difference between the load on each of the hooks, which is a function of the cargo weight, initial load split between the cargo hooks, and hook separation distance on the aircraft, plus the forces produced by changes in the direction of movement of the aircraft and movement of the cargo being carried. The dynamic load split condition exists if the difference between the load on each hook undergoes a rapid change, indicating a shifting of load from one hook to the other. Preferably, the threshold level for the dynamic load split condition is adaptively set based on the measured prefailed load on the failed hook, limited by a minimum value.

Third, the method and apparatus of the invention determines if a rapid rate-of-decrease condition exists. A rapid rate-of-decrease condition exists if a rapid rate-of-decrease in the load supported by either hook occurs. Preferably, the mount of decrease that must occur is adaptively set based on the prefailed load on the hook, limited by a minimum value. If the load on a hook decreases more than a threshold value within a short period of time, the rapid rate-of-decrease condition exists. The rapid rate-of-decrease condition prevents false jettisons during prolonged low G maneuvers, which tend to reduce the hook loads. Aircraft maneuvers which reduce hook loads do so at a slower rate of change than sudden suspension system failures, due to the aircraft and load inertias. The rapid rate-of-decrease condition also prevents jettisons when a load begins to pendulum from front to rear.

If all three conditions exist at either the forward or aft hook, the invention determines that a failure has occurred at the related hook and the cargo is automatically jettisoned. Because the threshold for each of the three conditions is adaptively determined based on the actual load suspended from each hook, the method provides a more accurate determination of suspension point failure for a broader variety of loads than would be the case if fixed thresholds were used.

The existence of less than all three conditions may also be used to determine when a suspension system failure has occurred. In particular, the zero load condition alone or in combination with the dynamic load split condition can be used to accurately detect most suspension system failures. Obviously, the existence of all three conditions provides the most robust system for detecting any form of dual-point suspension system failure.

In accordance with a further aspect of this invention, a fourth condition, separate from the evaluation of the three conditions discussed above, is evaluated. The results of the evaluation of the fourth condition are used to make an alternate autojettison decision. The fourth condition is a load limit condition. The load limit condition is met when a preselected structural load limit of a hook is exceeded. If the load on a hook nears the structural limit that the hook is designed support, the cargo is automatically jettisoned. The load limit condition is not adaptively set, but is set based upon the specific hook hardware. This condition protects the aircraft from structural damage.

An advantage of the present invention is that it is adaptive to different cargos carried by a two-point suspension system. The existence of the conditions that are indicative of a hook failure are not based on predetermined criteria or criteria entered for each cargo. Rather, the system actively changes the condition thresholds by measuring the actual load supported by each hook during flight. Adaptively setting the threshold for each condition provides a more accurate determination of suspension point failure for a broader variety of cargos.

A further advantage of the present invention is that the use of three conditions eliminates false alarms and detection failures. The use of three conditions creates a robust system that eliminates spurious readings generated by movement of a load as an aircraft performs different maneuvers.

Another advantage of the present invention is that it may be implemented in both analog and digital form. This allows the method to be incorporated into existing aircraft systems with minimal redesign.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
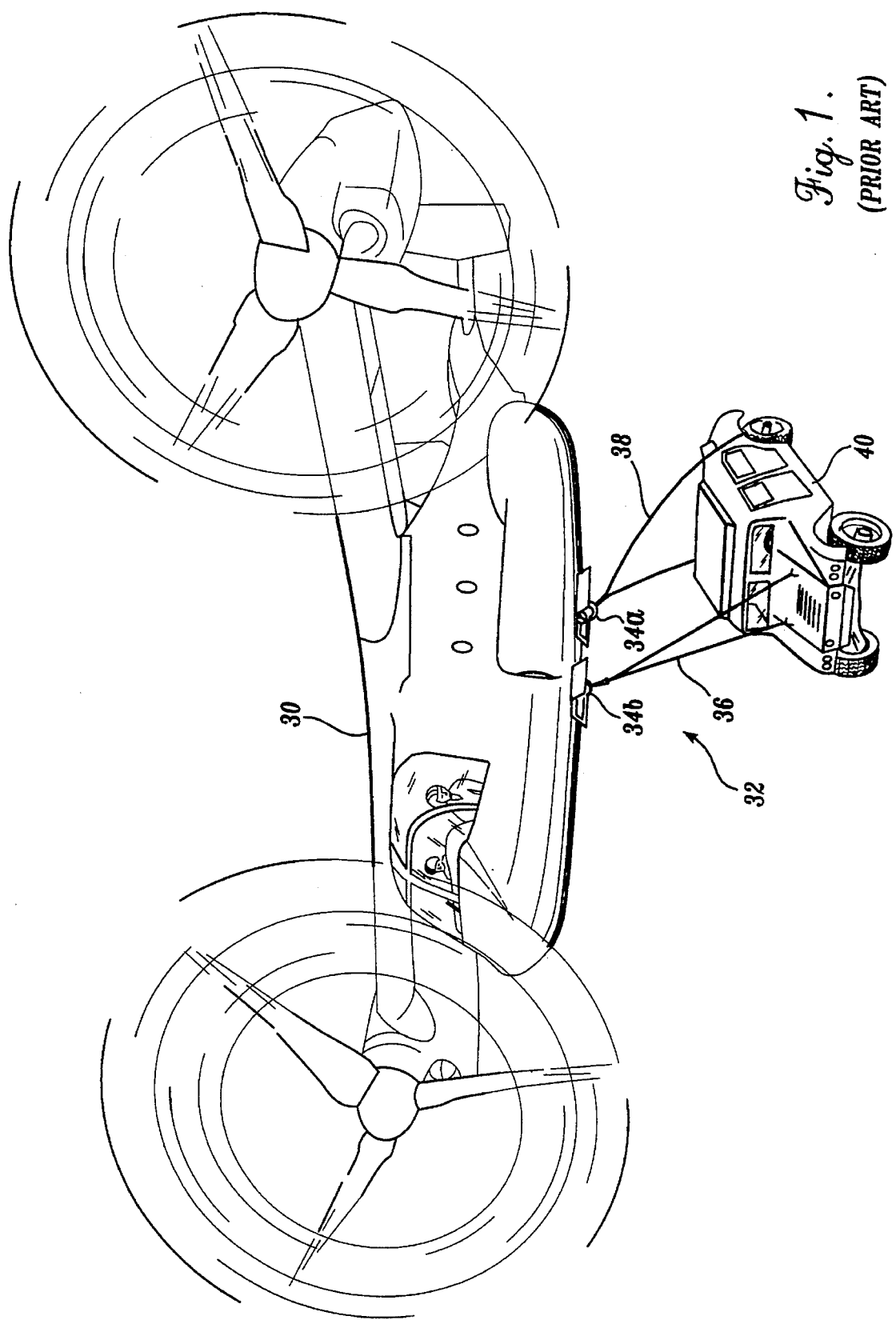
FIG. 1 is a pictorial view showing the use of a dual-point suspension system to carry a load beneath a tiltrotor aircraft.

FIG. 1 is a pictorial view of the environment in which embodiments of the present invention are used. FIG. 1 illustrates an aircraft 30, depicted as a tiltrotor, provided with a dual-point suspension system 32 that includes a forward hook 34a and an act hook 34b. The forward and act hooks are positioned on the bottom of aircraft 30, and are located along the longitudinal axis of the aircraft. While the aircraft 30 shown in FIG. 1 is a tiltrotor aircraft, namely the V-22 Osprey, it is to be understood the invention can be used with other types of aircraft, particularly helicopters. The invention also can be used in other environments where a load suspended from a dual-point suspension is subjected to forces that may cause a point of the suspension system to fail, such as a load suspended beneath a crane.

Cargo 40, depicted as a jeep, is suspended from the forward and aft hooks 34a and 34b. The cargo is connected to the forward hook by a forward sling 36 and to the aft hook by an aft sling 38. While the cargo shown in FIG. 1 is a jeep, this cargo load is to be taken as illustrative, not limiting. The present invention will work for a variety of cargo loads suspended beneath an aircraft. The type of cargo is only limited by the carrying capabilities of the aircraft incorporating the invention.

The present invention is a method and apparatus for determining when a dual-point suspension system of the type shown in FIG. 1 fails, requiring the jettisoning of the cargo 40 from beneath the aircraft 30. Failure of the dual-point suspension system can occur in two ways. A component of the suspension system can fail. For example, the forward hook 34a or the forward sling 36 could break, transferring the cargo 40 to the unfailed rear sling 38 and rear hook 34b. Alternatively, the cargo 40 may break into several pieces, leaving a portion of the cargo suspended from the forward hook 34a and a portion of the cargo suspended from the aft hook 34b. Either failure of the dual-point suspension system makes the automatic detection of the failure and quick release of the cargo 40 from the hooks desirable, since either failure could create a swinging load that could damage the aircraft 30. For the purposes of this description, a failure of the cargo or a failure of a component in the suspension system are hereinafter referred to generally as a failure of the suspension system.

In a dual-point suspension system, the cargo 40 is not always equally suspended from the forward and aft hooks. During flight, the forward motion of the aircraft shown in FIG. 1 will cause the cargo to swing towards the rear of the aircraft. When this occurs, the forward hook 34a will be subjected to a greater load than the aft hook 34b. When the aircraft 30 changes direction, or climbs or dives, the load on each hook also changes. Similarly, turbulence can also affect the load on the hooks of a dual-point suspension system. The present method is designed to detect failures of the suspension system in this environment, and eliminate false alarms that may be generated by movement of the cargo 40 beneath the aircraft 30.

Figure 2:
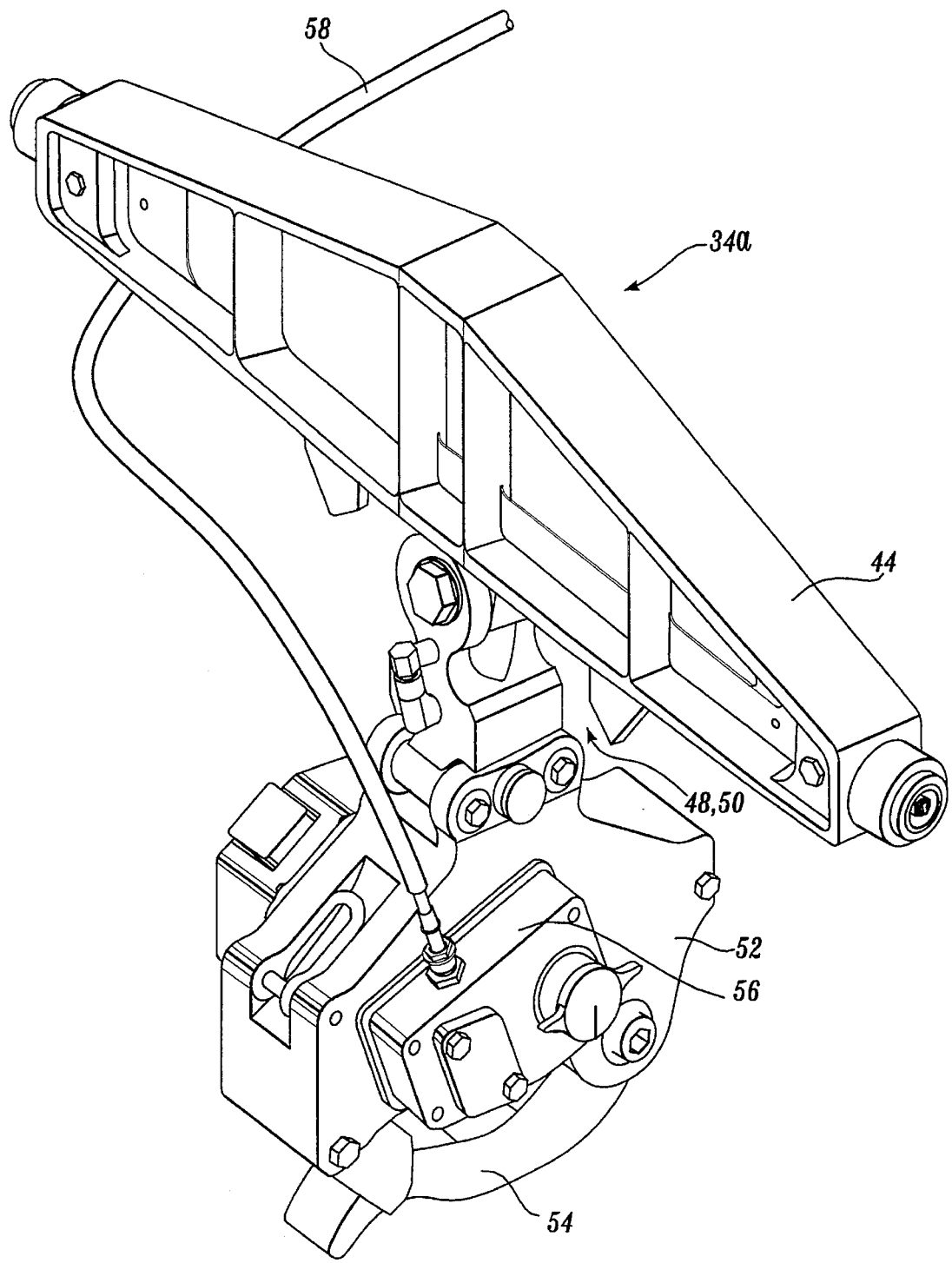
FIG. 2 is an isometric view of an actual embodiment of a hook used in a dual-point suspension system.

FIG. 2 is an isometric view of a cargo hook usable in a dual-point suspension system. The hook shown in FIG. 2 is a forward hook 34a. Since aft hooks 34b are similarly configured, and operate in an identical manner, for purposes of brevity of description, no aft hook description is set forth here. Further, since such hooks are well known and do not, per se, form part of the present invention, only a brief description of the hook shown in FIG. 2 is set forth here.

The forward hook 34a shown in FIG. 2 consists of a body 52 attached to a beam 44 by a linkage assembly 46. The beam 44 is attached to the aircraft in a way that allows the hook to rotate fore and aft. The linkage assembly 46 is attached to the beam in a way that allows the hook body 52 to rotate from side to side. The mounting of the body 52 to the beam and linkage assembly therefore allows the body of the hook to move with two degrees of freedom. The hook body 52 includes a hook jaw 54 from which cargo is suspended. The hook jaw 54 may be manually or automatically opened and closed to connect or disconnect cargos from the hook.

For purposes of this description, two aspects of the construction and operation of the hook 34a are of particular significance. First, the hook is constructed with a pair of load cells 48 and 50, which cannot be seen in FIG. 2, mounted on the linkage assembly 46. The load cells 48 and 50 each produce a voltage that is proportional to the mount of the load suspended from the hook. The load includes the weight of the cargo plus forces created by movement of the cargo or the aircraft as the cargo is being transported. Two load cells are contained in the linkage assembly to provide redundancy in case one of the load cells fails. In one actual embodiment of the invention included on a V-22 Osprey, the load cells within the hooks are rated to have an accuracy of +/−100 pounds +/−2% of the applied load between 1,000 and 10,000 pounds.

The second aspect of the hook 34a that is important is the inclusion of a hook release mechanism 56. The hook release mechanism 56 is mounted on the side of the hook body 52, and is attached to a control cable 58. The hook release mechanism contains a solenoid (not shown) that is used to lock hook jaw 54 in the closed position. When an appropriate command carried by the cable 58 is received, the hook release mechanism actuates the solenoid, causing the hook jaw 54 to unlock and open and the cargo suspended from hook 34a to be jettisoned. Thus, the hook jaw 54 is remotely operable via the cable 58. While only one hook is shown in FIG. 2, because the invention is an autojettison system for cargo suspended from dual-point suspension systems, it is to be understood that the forward and aft hooks 34a and 34b will normally be connected to receive the same jettison control signals so that both hooks simultaneously receive a jettison command. In this way, suspended cargo 40 is released by the simultaneous opening of the forward and aft hooks. Alternatively, as those skilled in the art will recognize, the hook release mechanism of forward hook 34a and aft hook 34b could receive separate jettison control signals.

Figure 3:
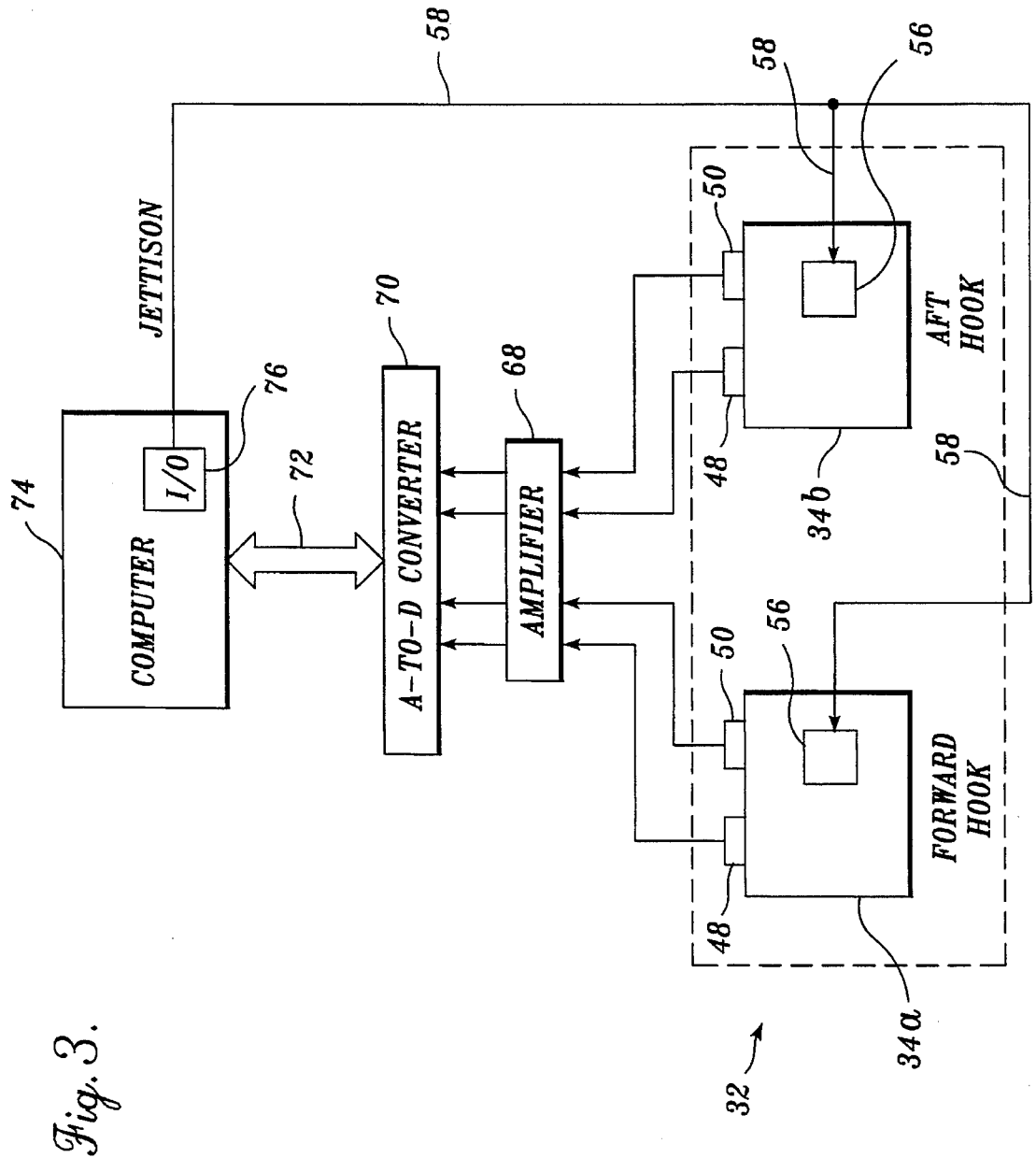
FIG. 3 is a block diagram of a system for implementing the method of the invention.

A block diagram of a system for implementing the invention in digital form is provided in FIG. 3. Located beneath the aircraft is a dual-point suspension system 32 that includes the previously described forward hook 34a and aft hook 34b. As has been discussed with respect to FIG. 2, each of the hooks contains two load cells 48 and 50. Each of the load cells controls the magnitude of an analog voltage signal such that the magnitude is proportional to the load carried by each hook. The load cells on the forward and aft hooks 34a and 34b are connected to an amplifier network 68. The amplifier network 68 amplifies the rather weak load cell voltage signals. The output of the amplifier network is a series of amplified analog signals, each of whose voltage is linearly proportional to the load carried by the related cargo hooks. In an actual embodiment of the invention incorporated in a V-22 Osprey, the outputs of the amplifier network 68 range from 0 to 4.5 volts. This voltage range is linearly scaled so that each output volt represents approximately 8,889 lbs. of load on the hook. For example, a 4.5 volt output from the amplifier network 68 would correspond to a hook load of approximately 40,000 pounds. Those skilled in the art will recognize that the scaling and ranges described above are merely representative of one environment in which the disclosed invention is practiced. The scaling and ranges may be varied by selecting different types of load cells, or by varying the amplification provided by the amplifier network 68.

The outputs of the amplifier network 68 are connected to an analog-to-digital converter 70. The analog-to-digital converter periodically samples the amplified analog signals generated by each of the load cells and produces a digital representation of the voltage level of the signals. In an actual embodiment of the invention, the chosen analog-to-digital converter 70 has a 300 Hz sampling rate.

The analog-to-digital converter 70 is connected to a computer 74 via a bus 72. The computer 74 is microprocessor-based, and includes processing means (not shown), volatile and nonvolatile memory (not shown), and one or more input/output (I/O) devices 76. As will be further discussed below, the computer 74 is programmed to implement the present invention. The I/O devices 76 of the computer 74 are connected to the forward hook 34a and aft hook 34b by the cable 58. As noted above, the cable 58 carries the jettison command signals to the forward and aft hooks 34a and 34b. When a jettison command is produced, the hook release mechanism 56 on each hook opens, releasing the cargo suspended from the hooks. Rather than being digitally based, the functions of the computer described below can be implemented by an analog circuit system, if desired.

Figure 4:
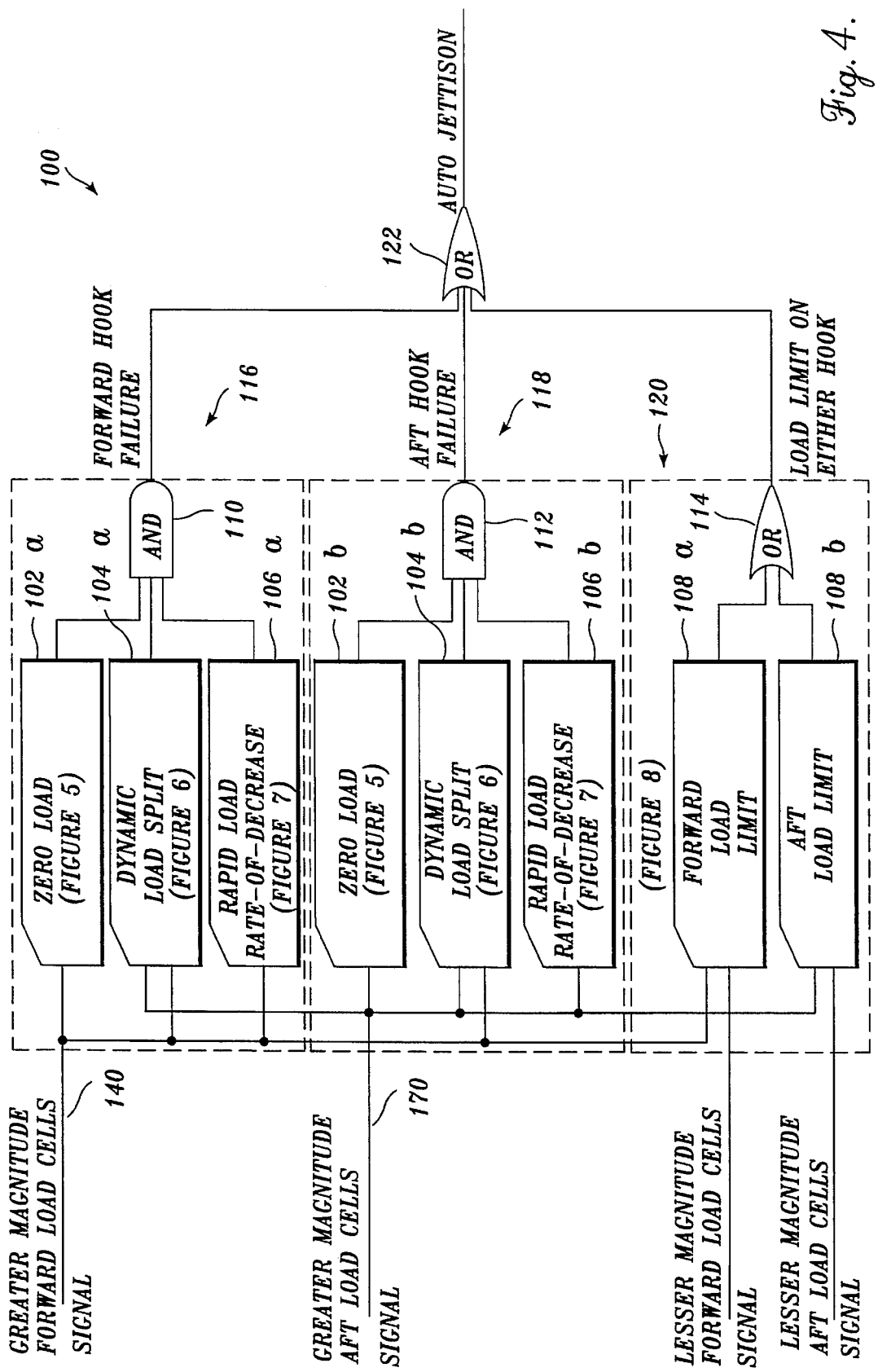
FIG. 4 is a block diagram of the subroutine used to determine whether to generate an autojettison command by evaluating zero load, dynamic load split, rapid load rate-of-decrease, and load limit conditions on the forward and aft hooks of a dual-point suspension system.

The present invention is directed to an improved method and apparatus for detecting when either the cargo or a component of a dual-point suspension system fails and jettisoning the cargo when a failure is detected. A functional block diagram of the operation of the computer 74 is shown in FIG. 4. For ease of illustration and understanding, the functional block diagram is depicted as an autojettison program 100 having a number of subroutines running in parallel. Obviously, the functions performed by the subroutines could be performed serially, or by a plurality of separate dedicated processors, or in other ways familiar to those skilled in the microprocessor art. In general, the autojettison program 100 will cause cargo to be jettisoned when there is an indication that either the forward or the aft hook has failed. An autojettison decision is solely based on signals received from the load cells of the forward and aft hooks. As shown in FIG. 4, the greater of the two load cell signals is used to determine if a hook has failed. That is, a greater magnitude forward load cell signal 140 and a greater magnitude aft load cell signal 170 is each provided to autojettison program 100. Choosing the greater signal ensures that the system will not erroneously make a jettison determination if one of the load cells suffers a failure to a zero output condition. Also as shown in FIG. 4, the lesser of the two load cell signals is used to determine if a hook load limit is exceeded. Choosing the lesser signal ensures that the system will not make an erroneous jettison determination if one of the load cells suffers a failure to a maximum output condition.

The autojettison program 100 contains three subroutines to determine if there has been a failure on a forward or an aft hook. A forward hook failure subroutine 116 determines if there has been a failure on the forward hook. An aft hook failure subroutine 118 determines if there has been a failure of the aft hook. Finally, a load limit subroutine 120 determines if a structural load limit has been reached on either the forward or the aft hook. The logic outputs of the subroutines 116, 118, and 120 are functionally shown as ORed together by an OR gate 122. The output of the OR gate 122 is true if any of its inputs are true. Thus, if any of the subroutines indicate that a hook failure has occurred, the output of OR gate 122 will become true. Thus, the autojettison system 100 will cause the cargo to be jettisoned from the two-point suspension system if: (i) a forward hook failure occurs, (ii) an aft hook failure occurs, or (iii) the structural load limit on either hook is reached.

Figure 5:
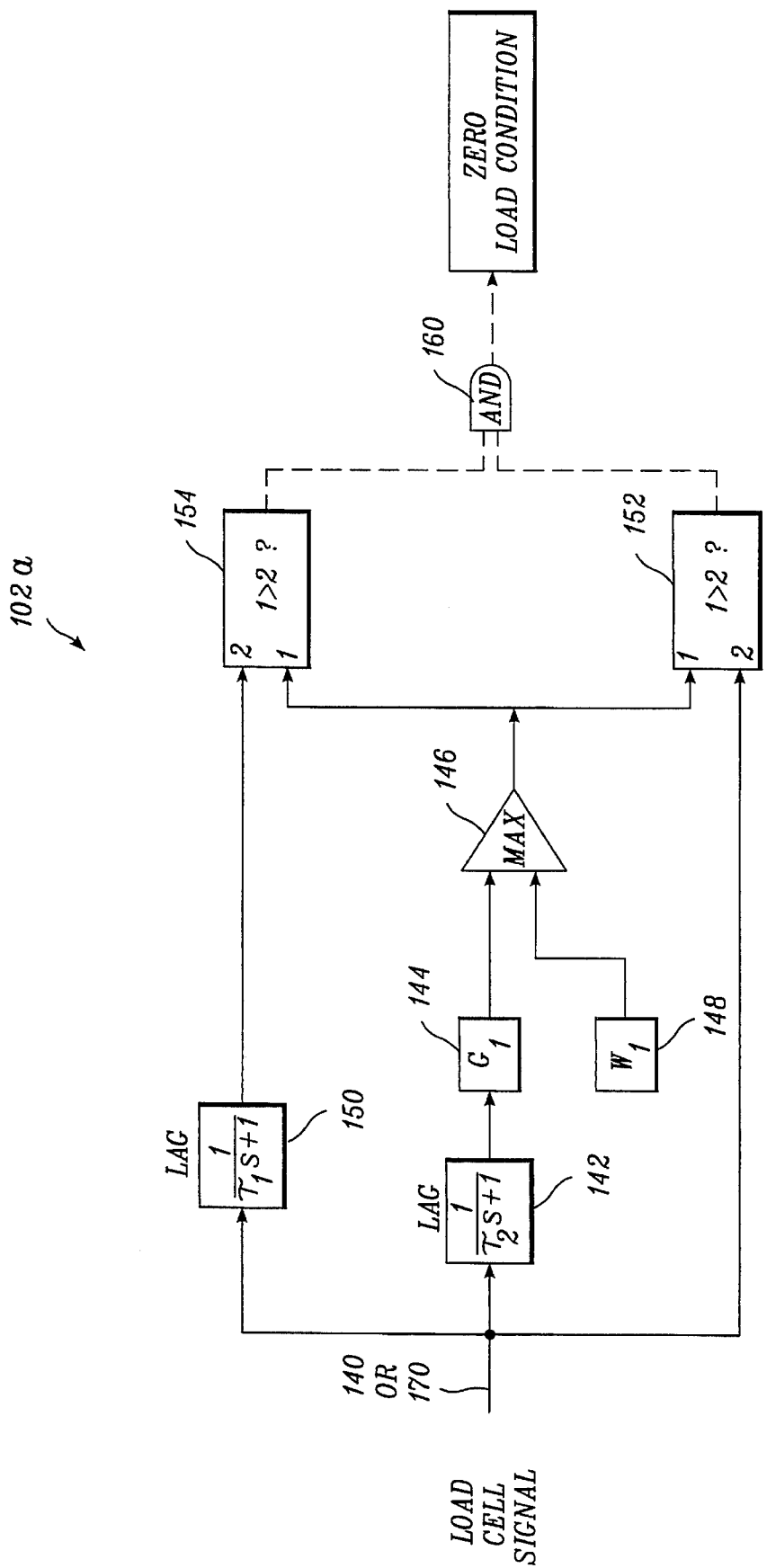
FIG. 5 is a functional block diagram of a subroutine suitable for use in FIG. 4 for evaluating the zero load condition.
Figure 6:
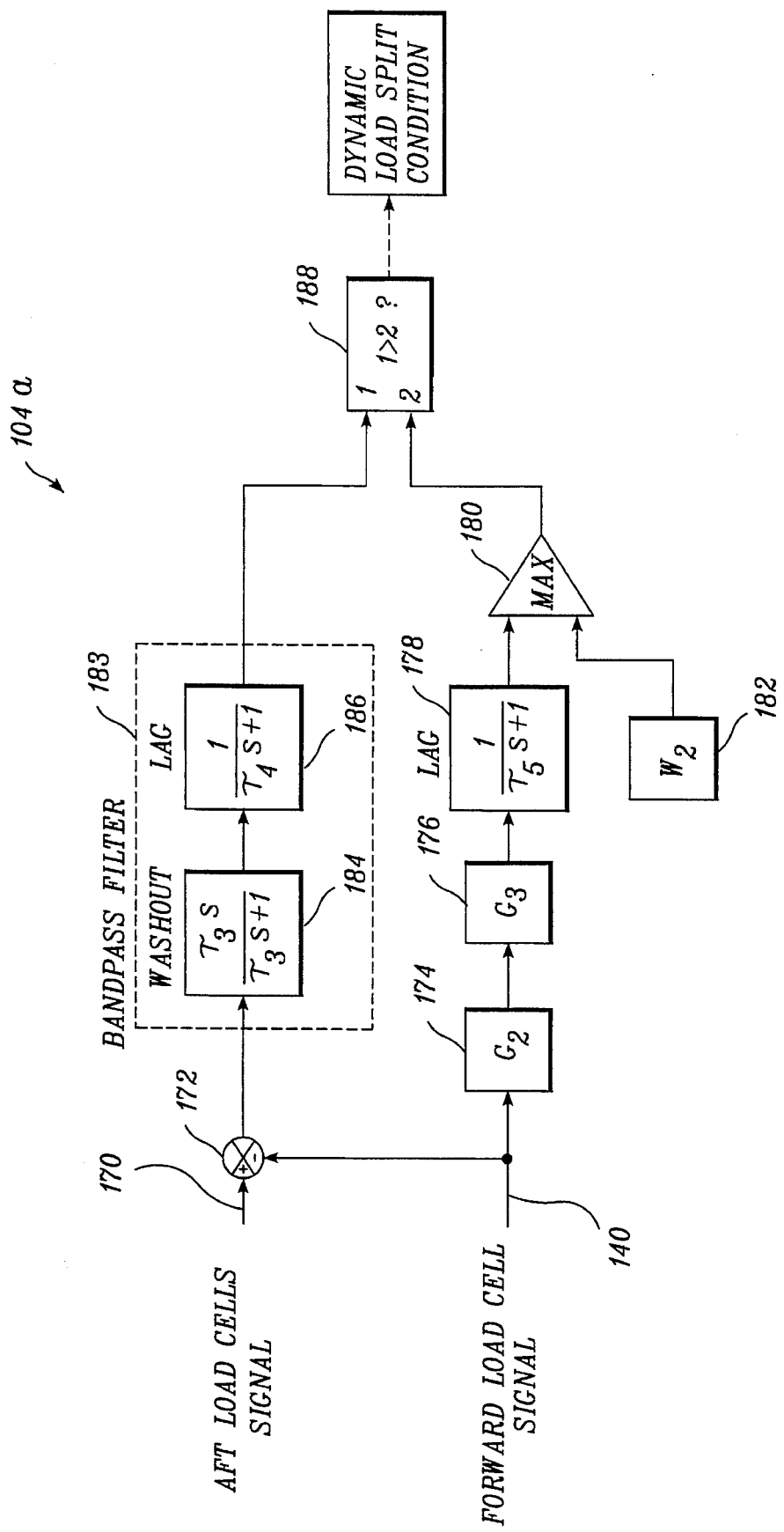
FIG. 6 is a functional block diagram of a subroutine suitable for use in FIG. 4 for evaluating the dynamic load split condition.
Figure 7:
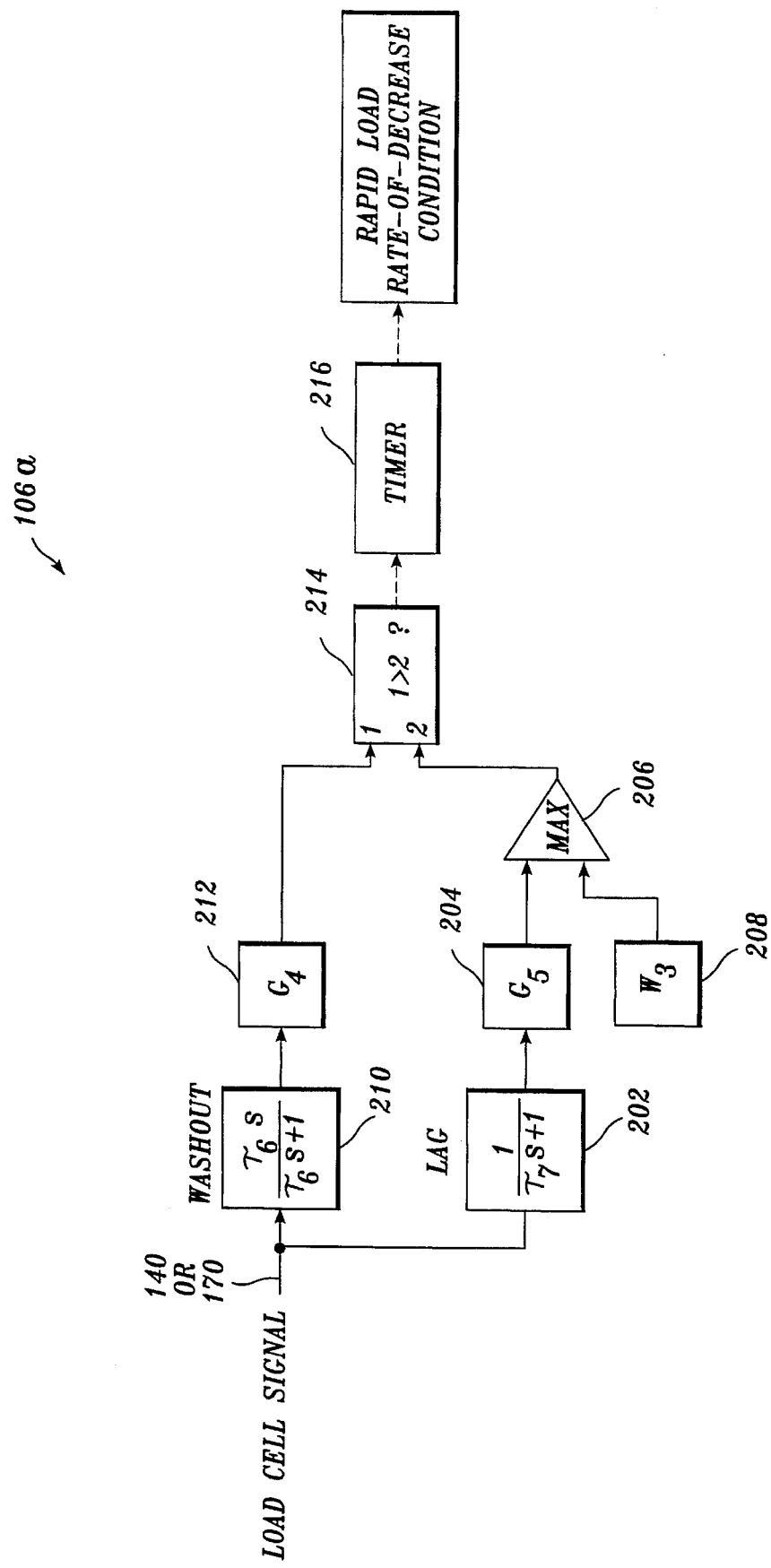
FIG. 7 is a functional block diagram of a subroutine suitable for use in FIG. 4 for evaluating the rapid load rate-of-decrease condition.

As also shown in FIG. 4, both the forward and aft hook failure subroutines 116 and 118 evaluate several conditions to determine if a hook failure has occurred. Both subroutines evaluate three conditions to determine if a hook has failed: a zero load condition 102a or 102b, a dynamic load split condition 104a or 104b, and a rapid load rate-of-decrease condition 106a or 106b. The results of each evaluation are functionally combined by an AND gate 110 or 112. The outputs of the AND gates 110 or 112 are only true if all three of the conditions are satisfied. That is, the zero load condition, dynamic load split condition, and rapid load rate-of-decrease condition must all exist before the output of the related AND gate 110 or 112 indicates that a forward hook failure has occurred. Control system diagrams suitable for analyzing each of these conditions are illustrated in FIGS. 5, 6, and 7 and described next. More specifically, for ease of illustration and understanding, the operation of the hook failure subroutines 116 and 118 (FIGS. 5, 6, and 7) and the load limit subroutines (FIG. 8) are shown in functional forms as control system diagrams. In actual use, the functions depicted in the control system diagrams would be carried out by a suitably programmed digital microprocessor system or a suitably designed analog system, the microprocessor system being preferred.

FIG. 5 is a control system diagram showing how the load cell signals are evaluated to determine if a zero load condition exists. In general, the load on a cargo hook is monitored to determine if both the average and the instantaneous load are below a threshold value. If both load values fall beneath the threshold value, the zero load condition exists. In other words, the load must have been "zero" for some time, and it must be "zero" right now, in order for the zero load condition to exist.

As shown in FIG. 5, the control system diagram includes three signal paths, an upper path, a lower path, and a center path. Each path receives the same load cell signal 140 or 170, i.e., the signal from the highest reading load cell of the related hook. The upper path determines the average load value over a predetermined time period. The center path adaptively determines the threshold value, and the lower path is the instantaneous load value. The upper and center path values are compared, as are the center and lower path values, to determine if the zero load condition is satisfied.

The center path begins with a low-pass lag filter 142, which filters the load cell signal 140 or 170 to produce a signal that represents the average prefailed cargo hook load value. That is, the time constant $\tau_2$ of the filter 142 is selected to be long enough for the prefailed value of the load cell to be held approximately constant during a cargo hook failure evaluation. In one actual embodiment of the invention designed to jettison a load in less than 1.2 seconds after failure, the value chosen for $\tau_2$ was 3 seconds.

The output of the low-pass lag filter 142 is multiplied by a gain 144 to produce the adaptive threshold value. The gain 144 is selected to be a fraction indicative of the minimum amount of a load that can remain connected to the cargo hook without the cargo being jettisoned. For example, if the value of the gain is set to 0.3, the average and instantaneous load values would have to drop to less than 30% of the prefailed load value in order to satisfy the zero load condition. A suitable range for the constant $G_1$ of the gain 144 is 0.1 to 0.3. In one actual embodiment of the invention, 20% was determined to be an appropriate choice for the amount of load that could remain attached to a cargo hook and still have the system jettison the load. The constant $G_1$ of the gain 144 in this embodiment was therefore set to 0.2.

The final step in setting a threshold level is comparing the adaptive threshold level output by the gain 144 with a minimum threshold value 148 to determine which is greater. A first comparator 146 is used to make this determination. The minimum threshold value 148 is a constant, $W_1$, that is selected based on the particular application of the invention, including the loads that are expected to be carried. In an actual embodiment of the invention, the chosen value for $W_1$ corresponded to 300 pounds. The comparator 146 sets the threshold level by selecting the larger of the adaptive threshold value or the minimum threshold value. Thus, the threshold level is the adaptive threshold value limited by a minimum threshold value.

The threshold level determined from the load cell signal is continuously compared against the instantaneous signal representing the load on the cargo hook. A second comparator 152 compares the threshold level and the instantaneous load value. The second comparator 152 outputs a true logic state if the instantaneous load on the cargo hook falls below the threshold level.

A third comparator 154 compares the threshold level with the value of the average load placed on the cargo hook, as calculated over a selected period of time. The average load value is determined in the upper path shown in FIG. 5. More specifically, the load cell signal 140 or 170 is filtered by a low-pass lag filter 150. The low-pass lag filter 150 has a time constant $\tau_1$ that is selected to be long enough to filter noise out of the hook load signal while leaving an indication of the average load on the cargo hook over a period of time that is less than the failure detection time. In an actual embodiment of the system, a value of 0.2 seconds for time constant $\tau_1$ was determined to be long enough to filter out hook load signal noise and provide an average load value. The third comparator 154 outputs a true logic state if the average load on the cargo hook falls below the threshold level.

The zero load condition is finally evaluated by logically summing the outputs of the second comparator 152 and the third comparator 154. An AND gate 160 is illustrated as performing this function. The output of the AND gate 160 will only become true if the output from both comparators 152 and 154 are true. That is, both the instantaneous weight on a hook and the average weight on a hook must have fallen below the threshold level for the zero load condition to be satisfied. If this has occurred, the zero load condition exists at the related one of the hooks.

The second condition that is evaluated to determine if a forward or aft hook failure has occurred is the dynamic load split condition. FIG. 6 is a control system diagram showing how the dynamic load split condition is evaluated for the forward hook. The aft hook evaluation is the same except that the aft and forward load cell signal inputs are reversed.

When one of the cargo slings or hooks fails in a dual-point suspension system, the load from the failed hook will transfer to the unfailed hook. The dynamic load split condition is evaluated by monitoring the difference between the load on the forward hook and the load on the aft hook to determine when a significant fraction of the load on one hook rapidly transfers to the other hook. In order for the dynamic load split condition to be true, the difference between the hook loads must have increased by more than a threshold value within a short period of time. This condition is satisfied when the load on the failed hook drops substantially, while the load on the unfailed hook increases. For the purposes of this description, the difference between the forward load cell signal and the aft load cell signal will hereinafter be referred to as the differential load signal.

As shown in FIG. 6, the dynamic load split condition evaluation uses the aft load cell signal 170 and the forward load cell signal 140. As noted above, the control system diagram shown in FIG. 6 determines the dynamic load split condition for the forward hook. That is, the control system shown in the diagram determines that the forward hook has failed because the load on the forward hook has been transferred to the aft hook within a short period of time. Calculating the dynamic load split condition for the aft hook simply requires switching the aft load cell signal 170 and the forward load cell signal 140.

The control system shown in FIG. 6 includes two paths, a lower or adaptive threshold value path and an upper or load value path. The values determined by the paths are compared to determine if a dynamic load split condition is present. Turning first to the adaptive threshold value path, the forward load cell signal 140 is used to calculate a threshold value. Specifically, the forward load cell signal 140 is first multiplied by a first gain 174. The value of the first gain 174 is selected to be the amount that the differential load signal is expected to change when the load from one hook is transferred to the other hook. As an example, if the initial load on the forward hook is L1 and on the aft hook is L2, the difference between these loads will be L2–L1. If the forward hook fails, then the load on the forward hook will be transferred to the rear hook, which will now support the load of L2+L1. The difference between the prefailed (L2–L1) and the post-failed (L2+L1) load is therefore twice the level carried on the failed forward hook (2*L1). In other words, the amount of weight shift from the forward to the aft hook is dependent upon the prefailed load on the forward hook. Thus, in a dual-point suspension system, the most appropriate value for $G_2$ is 2. The prefailed forward load cell signal 140 is multiplied by $G_2$ in order to compute the expected shift in the differential load signal (i.e., twice the value of the prefailed load on the failed hook).

After being multiplied by $G_2$, the forward load cell signal 140 is multiplied by a second gain 176. The value, $G_3$, of the second gain 176 is selected to correspond to the amount of differential shift that should occur before a dynamic load split condition is detected. A suitable range for $G_3$ is between 0.5 and 1.0. In one actual embodiment of the invention, $G_3$ has a value of 0.67. This value corresponds to the response of a bandpass filter 183 that is used to filter the differential load signal, the response measured approximately one time constant $\tau_4$ after a unit step input. When this value is chosen, the adaptive threshold value is set so that when the system detects the expected differential shift onto the unfailed hook, the dynamic load split condition is satisfied within approximately one time constant $\tau_4$. If less than the expected differential load shift occurs, or if the differential load shift is spread out over a period of time, the dynamic load split condition will either be met later (allowing other conditions the opportunity to block false alarms), or not at all. It will be recognized by one skilled in the art that first gain 174 and second gain 176 could be combined into a single gain; the gains are separately described herein for clarity.

After multiplication by $G_3$, the forward load cell signal 140 is filtered by a low-pass lag filter 178. The low-pass lag filter 178 filters the forward load cell signal in a way that produces a signal that represents the average prefailed value of the forward cargo hook load. The time constant of the low-pass lag filter 178 is chosen to be long enough for the prefailed signal level to be held approximately constant during a cargo hook failure. That is, the time constant $\tau_5$ of the low-pass lag filter 178 is selected to be longer than any expected cargo hook failure detection time. In an actual embodiment of the invention, $\tau_5$ has a value of 3 seconds. Thus, the output of low-pass lag filter 178 has a value that corresponds to a multiple of the prefailed load on the failed hook.

The final step in setting a threshold for the dynamic load split condition is comparing the adaptive threshold value output of the low-pass lag filter 178 with a minimum threshold value 182 to determine which is the maximum value. The minimum threshold level 182 is a constant $W_2$ that is selected to be the minimum amount of weight that can shift from one load hook to another without a dynamic split load condition being detected. In an actual embodiment of the invention, $W_2$ has a value of 600 pounds. A first comparator 180 selects the threshold level for the dynamic load split condition by comparing the adaptive threshold value with the minimum threshold value and outputting the greater value.

As the threshold value is being continuously determined from the forward load cell signal, it is being continuously compared against the actual differential load value, which is derived in the upper path shown in FIG. 6. First, the forward load cell signal 140 is subtracted from the aft load cell signal 170 by a subtractor 172 to produce a differential load value. The differential load value is then filtered by bandpass filter 183. Preferably, the bandpass filter 183 is constructed from a high-pass washout filter 184 and a low-pass lag filter 186. The high-pass washout filter 184 is designed to remove the steady "average" component from the differential load value and pass through any short-term variations. The low-pass lag filter 186 removes high frequency noise. Removal of high frequency noise prevents electrical noise and load vibration from inadvertently simulating the dynamic load split condition. The combination of the high-pass washout filter 184 and the low-pass lag filter 186 delay the response time of the differential load signal. That is, the differential load signal is somewhat delayed with respect to the actual weight shift between the two cargo hooks. This delay is compensated for by the appropriate selection of constant $G_3$ in gain 176 as discussed above. While various values can be used to construct the bandpass filter, in one actual embodiment of the invention, the time constant $\tau_3$ of the high-pass washout filter was chosen to be 3 seconds and the time constant $\tau_4$ of the low frequency lag filter was chosen to be 0.2 seconds.

The hook dynamic load split condition is evaluated by comparing the value of the differential load output by the bandpass filter 183 with the threshold level output by the first comparator 180. A second comparator 188 compares these values. If the load shift from the forward hook to the aft hook exceeds the threshold value, the dynamic load split condition exists and the second comparator 188 outputs a true logic state. The filtering action of the bandpass filter 183 determines the time period over which the load shift must occur in order for the load shift to create a load shift value that exceeds the threshold value. Slow load shifts will not create a suitably high load shift value. Only rapid load shifts will create such a value.

The third and final condition that is evaluated to determine if the forward or aft hooks have failed is the rapid load rate-of-decrease condition. FIG. 7 is a control system showing how the rapid load rate-of-decrease condition is evaluated. In order for the rapid load rate-of-decrease condition to be met, a load on a hook must decrease by more than a threshold value within a very short period of time. This condition distinguishes between a hook load going to "zero" because of a suspension failure (which is nearly instantaneous) and a hook going to zero due to aircraft motions (typically longer due to aircraft and load inertias). The rapid load rate-of-decrease condition evaluation prevents the system from being fooled by prolonged low G maneuvers, and prevents false jettisons when the load begins to pendulum fore/aft due to aircraft motion.

As shown in FIG. 7, the rapid load rate-of-decrease condition for the forward hook is based solely on the forward or aft load cell signal 140 or 170. The signal is conditional along two paths, an upper or load signal path and a lower or threshold path. In the load signal path a high-pass washout filter 210 filters the load cell signal 140 or 170 and removes all steady-state components from the signal except for those indicative of a rapid rate-of-decrease of the hook load. The high-pass washout filter 210 contains a time constant $\tau_6$ that is selected to be short enough to filter out decreases in load value caused by aircraft motion or gusts of wind, but long enough to leave in load value changes produced by a hook failure. In an actual embodiment of the invention, a $\tau_6$ value of 0.1 seconds was determined to be long enough to distinguish between these two conditions.

The output of the high-pass washout filter 210 is multiplied by a gain 212. The gain is used to shift the polarity of the filter output so that rapid decreases in the load cell signal will be recognized, and not rapid increases. This is accomplished by setting the value, $G_4$, of the gain 212 to $-1$. As a result, all negative transitions of the load cell signal are converted to positive and vice versa. Inversion is necessary so that the rapid decreases in the filtered load cell signal can be compared to a positive threshold value. Those skilled in the art will recognize that an equivalent result could be reached by using a negative, rather than positive, threshold value. Thus, the output from the gain 212 is a signal whose positive transitions correspond to a rapid rate of decrease in the forward load cell signal 140.

The load cell signal 140 or 170 is also used to calculate a threshold level. This is accomplished in the lower path shown in FIG. 7. First the load cell signal 140 or 170 is input into a low-pass lag filter 202. The low-pass lag filter 202 filters the load cell signal so as to produce a signal that represents the average prefailed value of the cargo hook load. This is accomplished by selecting the time constant $\tau_7$ of the low-pass lag filter 202 to be long enough for the filter to hold the prefailed value of the load cell during a cargo hook failure. In an actual embodiment of the invention, the value of $\tau_7$ was chosen to be 3 seconds. The value of the output from low-pass filter 202 therefore corresponds to the filtered average prefailed load cell value taken over a period of time determined by the value of $\tau_7$.

The average prefailed load cell value is next multiplied by a gain 204 to set an adaptive threshold level. The value, $G_5$, of gain 204 is selected to correspond to the response time of high-pass washout filter 210 that filters the load cell signal. As discussed above, the time constant of the high-pass washout filter 210 is selected to filter out those changes in the load cell signal caused by aircraft motion or gusts. The filtering also results in a reduced response to a rapid rate of decrease. The value of $G_5$ is chosen to account for the fact that the magnitude of the load cell signal drop created by the high pass washout filter 210 decreases as the period of load loss increases. For example, if the hook load drops by 50% instantaneously, the output of the high-pass filter 210 will decrease by approximately 50%. The filter output decrease is the same as the load drop because the load change is instantaneous. In contrast, if the 50% hook load drop occurs over a period of time equivalent to the time constant of high-pass washout filter 210, the filter output will only drop 32.5% due to the effect of the high-pass filter. In an actual embodiment of the invention it was desired to trigger the rapid rate-of-decrease condition when 50% of the load was removed from a hook within a period of time equal to the time constant of high-pass filter 210. To detect this loss, the value of $G_3$ was set to 0.325. This value set an "effective" adaptive threshold equal to 50% of the average prefailed load cell signal and assured that a 50% loss of the hook load would be detected even in the worst case circumstance, that is, when the loss occurred over a period equivalent to the time constant of high-pass filter 210. A suitable range of hook load loss that should be detected is from 40% to 60% of the prefailed load.

The final step in setting a threshold level is comparing the adaptive threshold value following the gain 204 with a minimum threshold value 208 and choosing the maximum value. A first comparator 206 is used to accomplish this result. The minimum threshold level 208 is a constant $W_3$ whose value is selected based on the particular application for the system, including the loads that are expected to be carried. In an actual embodiment of the invention, $W_3$ was chosen to correspond to 300 pounds. This value corresponded to the minimum decrease in hook load to be considered. It was set sufficiently high to avoid inadvertent tripping of the rapid load rate-of-decrease condition due to electrical noise or load vibration at very low weights. In summary, the threshold level is the adaptive threshold value limited by the value of $W_3$.

The rapid load rate-of-decrease condition is evaluated by comparing the decrease in the load cell signal value from the gain 212 with the threshold value from the first comparator 206. A second comparator 214 compares the hook load decrease value with the threshold value. If the decrease exceeds the threshold value, the rapid rate-of-decrease condition exists, and the second comparator 214 outputs a true logic state. The logic state of second comparator 214 triggers a timer 216, which holds the true logic state for a selected period of time. The timer 216 is necessary because of the transient nature of the rapid rate-of-decrease condition. If timer 216 did not open up a window in which the other two conditions indicative of a hook failure (i.e., the zero load condition and dynamic load split condition) could become true, the rate-of-decrease condition would quickly return to a false logic state and prevent the cargo from being jettisoned. In an actual embodiment of the invention, the timer 216 was designed to ensure that the rapid load rate-of-decrease condition stayed true for 2 seconds. This period was chosen because all jettisons that occurred during testing of the actual embodiment occurred in less than 1.2 seconds.

Returning to FIG. 4, it will be seen that the rapid load rate-of-decrease condition is the third and final condition that is analyzed in forward and aft hook failure subroutines 116 and 118. The logical results of the zero load condition 102a or 102b, evaluation, the dynamic load split condition 104a or 104b evaluation, and the rapid rate-of-decrease condition 106a or 106b evaluation are all ANDed together by an AND gate 110 or 112. The output from AND gate 110 or 112 will be true only when all three of the input conditions are true. Thus, all three conditions must be satisfied before a forward or aft hook failure is indicated. When a forward or aft hook failure occurs, the output of an OR gate 122 will become true, causing the cargo to be jettisoned.

Autojettison program 100 also contains a third subroutine that operates independent of the forward hook failure and aft hook failure subroutines. Specifically, as noted above, a load limit subroutine 120 is provided to evaluate the signal from both the forward and the aft load cells in order to determine if the load has exceeded some pre-selected structural limit of either cargo hook. If either the forward or the aft load cell signal indicates that the load has exceeded the chosen limit of the hook, the load limit subroutine 120 generates a logic true state on the output of OR gate 114, causing the cargo to be jettisoned.

Figure 8:
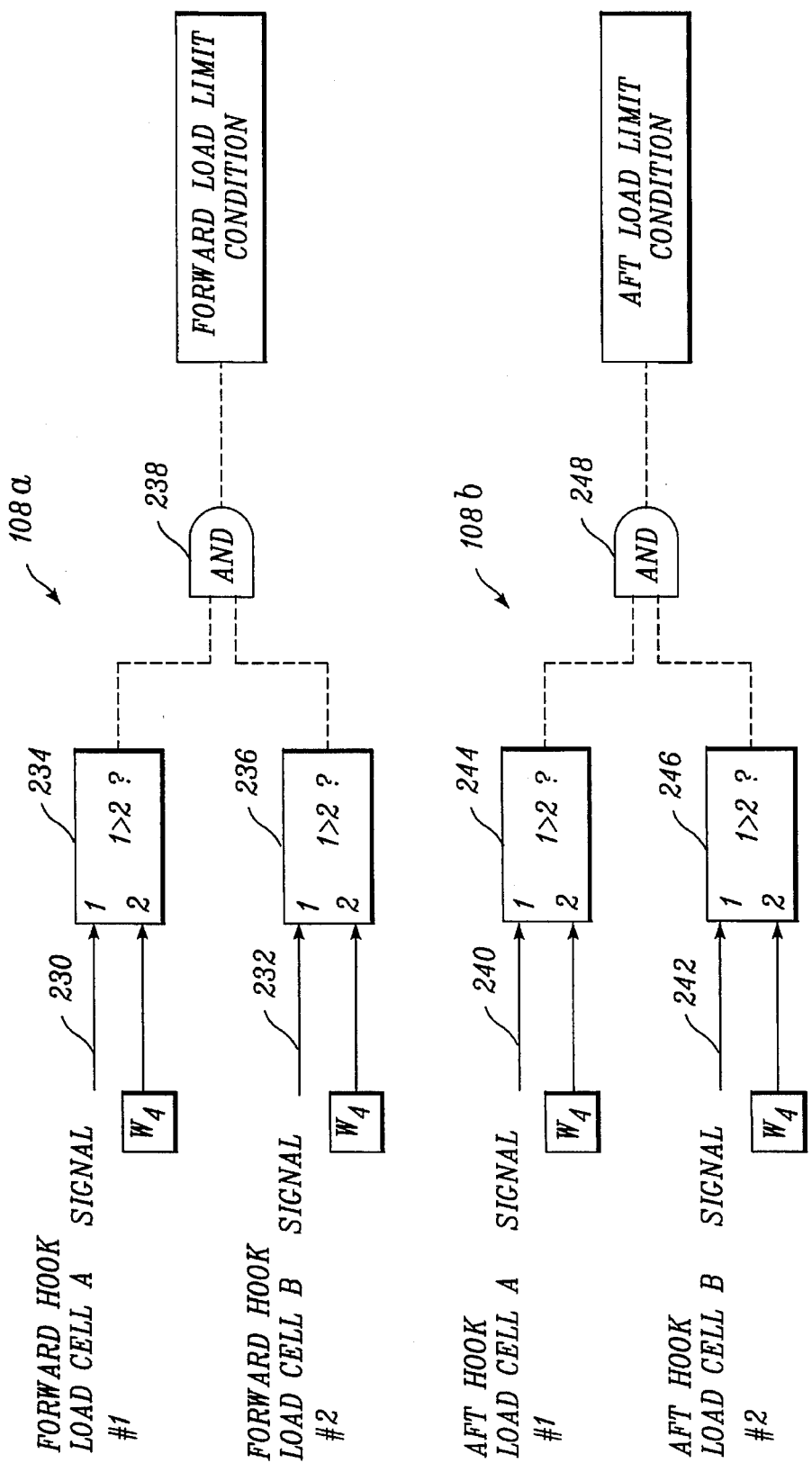
FIG. 8 is a functional block diagram of a subroutine suitable for use in FIG. 4 for evaluating the load limit condition.

FIG. 8 is a control system diagram suitable for evaluating when a forward or aft load limit condition is present. As shown in FIG. 8, two load limit conditions are evaluated for each dual-point suspension system. The forward hook load limit condition 108a is tested to determine whether the forward load limit condition exists based on the value of the two forward hook load cells. A first comparator 234 compares the magnitude of the signal from one of the forward hook load cells 230 with a constant $W_4$. Constant $W_4$ is selected based on the structural limit of the hook from which the load is suspended. In an actual embodiment of the invention, the design structural limit load of a hook used on a V-22 Osprey was 25,000 lbs. Therefore, $W_4$ was set to a level that corresponds to a 25,000 pound load limit. If the signal from the forward hook load cell exceeds the structural load limit, the comparator 234 outputs a logic true state. Similarly, a second comparator 236 compares the magnitude of the load cell signal from the other forward hook load cell 232 with the same constant $W_4$ and outputs a true logic state if the signal exceeds the constant level. An AND gate 238 receives the outputs from the comparators 234 and 236. If both comparators indicate that the load cell signals exceed the structural limit of the hook, the AND gate outputs a true logic state that indicates that the forward hook load limit condition has been exceeded.

The aft load limit condition 108b is similarly evaluated. Signals from the aft hook load cells are compared by a pair of comparators 244 and 246 with the structural limit constant $W_4$. If the load cell signals indicate that the chosen structural limit has been exceeded, the comparators 244 and 246 output a logic true state. An AND gate 248 receives these outputs, and generates a logic true state to indicate that the aft hook load limit has been exceeded.

Returning to FIG. 4, the results of the forward load limit condition 108a evaluation and the aft load limit condition 108b evaluation are input into an OR gate 114. If either of the inputs of the OR gate is logically true, the OR gate output becomes true. Thus, if either load limit evaluation determines that a hook load limit has been exceeded, a logical true state is generated to jettison the cargo.

The autojettison program of FIG. 4 provides a more accurate determination of when the cargo should be jettisoned when compared to prior art programs or analog systems because it is based upon an analysis of several different conditions during the transport of a load. Each of the conditions must be logically satisfied before an autojettison command is given. The method and apparatus disclosed herein provides a significant improvement over the prior art, in that it is less likely to generate false alarms or fail to detect potential suspension failures.

While a preferred embodiment of the invention has been illustrated and described, it will be appreciated that various changes can be made therein without departing from the spirit and scope of the invention. Those skilled in the art will recognize that while the term "hook" is used to describe the attachment point of the dual-point suspension system, other types of attachment points may be used. For example, the load may be suspended from a ball and socket attachment point.

It will also be recognized that other techniques for measuring a load placed on the attachment points are contemplated to fall within the scope of the present invention. For example, a sensor may be placed on the sling attached to the hook in order to measure the weight on the sling. The disclosed invention may be practiced in any environment where an accurate measure of the load on each attachment point can be determined.

It will further be recognized that autojettison program 100 and, more specifically, the subroutines for determining a forward or aft hook failure, can be based on an evaluation of less than all three conditions discussed above. An evaluation of the zero load condition forms a basis for an autojettison decision, and the addition of the dynamic load split condition and the rapid load rate-of-decrease condition ensures that the complete system will produce fewer false alarms and detection failures. A less robust system could be constructed, however, that determines a hook failure based on only a zero load condition, or a zero load condition in conjunction with a dynamic load split condition. Consequently, within the scope of the appended claims it will be appreciated that the invention can be practiced otherwise than as specifically described herein.

The embodiments of the invention in which an exclusive property or privilege is claimed are defined as follows:

1. A method of automatically jettisoning cargo suspended from a dual-point suspension system when a failure of the suspension system occurs, the dual-point suspension system having two attachment points that each incorporate a load cell generating a signal proportional to a load that is placed on the attachment point, said method comprising the steps of:

(a) determining from the load cell signals the instantaneous load on each of the two attachment points at a given time;

(b) determining from the load cell signals an average value of the load on each of the two attachment points over a preselected period of time;

(c) comparing the average value of the load and the instantaneous value of the load on each of the two attachment points with a first threshold value; and (d) jettisoning the cargo from the two attachment points if the instantaneous value of the load and the average value of the load at either of the attachment points are both less than the threshold value.

2. The method of claim 1, wherein the first threshold value is determined by:

(a) averaging the value of the load on each of the two attachment points over a period of time; and (b) taking a first percentage of the average value of the load on each of the two attachment points.

3. The method of claim 2, wherein the first percentage is within the range of 10% to 30%.

4. The method of claim 1, wherein the first threshold value is determined by:

(a) averaging the value of the load on each of the two attachment points over a period of time;

(b) taking a first percentage of the average value of the load on each of the two attachment points;

(c) comparing the first percentage average value of the load with a constant value; and (d) selecting the greater of the first percentage average value of the load and the constant value for use as the threshold value.

5. The method of claim 4, wherein the first percentage is within the range of 10% to 30%.

6. The method of claim 1, wherein each attachment point contains a second load cell and the step of determining from the load cell signals the load on each of the two attachment points further comprises:

(a) determining from the second load cell signals the load on each of the two attachment points;

(b) comparing the load determined from the first load cell signals with the load determined from the second load cell signals for each attachment point; and (c) selecting the greater load as the load for the related attachment point.

7. The method of claim 1, further comprising the steps of:

(a) subtracting the load on one of the two attachment points from the load on the other of the two attachment points to determine a differential load;

(b) filtering the differential load to remove its steady-state component;

(c) comparing the filtered differential load to a second threshold value; and (d) jettisoning the cargo from the two attachment points if the instantaneous value of the load and the average value of the load at either of the attachment points are both less than the first threshold value and if the filtered differential load is greater than the second threshold value.

8. The method of claim 7, wherein the second threshold value is determined by:

(a) averaging the value of the load on each of the two attachment points over a period of time; and (b) taking a second percentage of the average value of the load on each of the two attachment points and doubling it to determine an expected change in differential load due to a failure of the suspension system.

9. The method of claim 8, wherein the first threshold value is determined by:

(a) averaging the value of the load on each of the two attachment points over a period of time; and (b) taking a first percentage of the average value of the load on each of the two attachment points.

10. The method of claim 9, wherein the first percentage is within the range of 10% to 30% and the second percentage is within the range of 50% to 100%.

11. The method of claim 7, wherein the second threshold value is determined by:

(a) averaging the value of the load on each of the two attachment points over a period of time;

(b) taking a second percentage of the average value of the load on each of the two attachment points and doubling it to determine an expected change in the differential load due to a failure of the suspension system;

(c) comparing the expected change in the differential load with a constant value; and (d) selecting the greater of the expected change in the differential load and the constant value for use as the threshold value.

12. The method of claim 11, wherein the first threshold value is determined by:

(a) averaging the value of the load on each of the two attachment points over a period of time;

(b) taking a first percentage of the average value of the load on each of the two attachment points;

(c) comparing the first percentage average value of the load with a constant value; and (d) selecting the greater of the first percentage average value of the load and the constant value for use as the threshold value.

13. The method of claim 12, wherein the first percentage is within the range of 10% to 30% and the second percentage is within the range of 50% to 100%.

14. The method of claim 7, further comprising the steps of:

(a) determining the amount that the load on each of the two attachment points decreased within a selected period of time;

(b) comparing the amount of decrease on each of the two attachment points with a third threshold value; and (c) jettisoning the cargo from the two attachment points if the instantaneous value of the load and the average value of the load at either of the attachment points are both less than the first threshold value and if the filtered differential load is greater than the second threshold value and if the amount of decrease on either of the two attachment points is greater than the third threshold value.

15. The method of claim 14, wherein the first threshold value is determined by:

(a) averaging the value of the load on each of the two attachment points over a period of time; and (b) taking a first percentage of the average value of the load on each of the two attachment points.

16. The method of claim 15, wherein the second threshold value is determined by:

(a) avenging the value of the load on each of the two attachment points over a period of time; and (b) taking a second percentage of the average value of the load on each of the two attachment points and doubling it to determine an expected change in differential load due to a failure of the suspension system.

17. The method of claim 16, wherein the third threshold value is determined by:

(a) averaging the value of the load on each of the two attachment points over a period of time; and (b) taking a third percentage of the average value of the load on each of the two attachment points.

18. The method of claim 17, wherein the first percentage is within the range of 10% to 30% and the second percentage is within the range of 50% to 100% and the third percentage is within the range of 40% to 60%.

19. The method of claim 14, wherein the first threshold value is determined by:

(a) averaging the value of the load on each of the two attachment points over a period of time;

(b) taking a first percentage of the average value of the load on each of the two attachment points;

(c) comparing the first percentage average value of the load with a constant value; and (d) selecting the greater of the first percentage average value of the load and the constant value for use as the threshold value.

20. The method of claim 19, wherein the second threshold value is determined by:

(a) averaging the value of the load on each of the two attachment points over a period of time;

(b) taking a percentage of the average value of the load on each of the two attachment points and doubling it to determine an expected change in the differential load due to a failure of the suspension system;

(c) comparing the expected change in the differential load with a constant value; and (d) selecting the greater of the expected change in the differential load and the constant value for use as the threshold value.

21. The method of claim 20, wherein the third threshold value is determined by:

(a) averaging the value of the load on each of the two attachment points over a period of time;

(b) taking a third percentage of the average value of the load on each of the two attachment points;

(c) comparing the third percentage average value of the load with a constant value; and (d) selecting the greater of the third percentage average value of the load and the constant value for use as the threshold value.

22. The method of claim 21, wherein the first percentage is within the range of 10% to 30% and the second percentage is within the range of 50% to 100% and the third percentage is within the range of 40% to 60%.

23. The method of claim 14, wherein the selected period of time is between 0.05 and 0.15 seconds in length.

24. The method of claim 1, further comprising the step of jettisoning the cargo if the load placed on either one of the two attachment points nears a structural limit of the attachment point.

25. An apparatus for automatically jettisoning cargo suspended from a dual-point suspension system when a failure of the suspension system occurs, said apparatus comprising:

(a) a pair of load sensors, one of the load sensors located at each of the two attachment points of a dual-point suspension system for generating a signal proportional to a load that is placed on the attachment point;

(b) a release mechanism located at each of the two attachment points for automatically jettisoning the load carried by said attachment point upon receipt of a jettison command; and (c) a control system coupled to said pair of load sensors and to said release mechanism for determining when a load should be automatically jettisoned by:

(i) determining from the load sensor signals the instantaneous load on each of the two attachment points at a given time;

(ii) determining from the load sensor signals an average value of the load on each of the two attachment points over a preselected period of time;

(iii) comparing the average value of the load and the instantaneous value of the load on each of the two attachment points with a first threshold value; and (iv) producing a jettison command if the instantaneous value of the load and the average value of the load at either of the attachment points are both less than the first threshold value.

26. The apparatus of claim 25, wherein the control system determines the first threshold value by:

(a) averaging the value of the load on each of the two attachment points over a period of time; and (b) taking a first percentage of the average value of the load on each of the two attachment points.

27. The apparatus of claim 26, wherein the first percentage falls within the range of 10% to 30%.

28. The apparatus of claim 25, wherein each attachment point contains a second load sensor and the control system determines from the load sensor signals the load on each of the two attachment points by:

(a) determining from the second load sensor signals the load on each of the two attachment points;

(b) comparing the load determined from the first load sensor signals with the load determined from the second load sensor signals for each attachment point; and (c) selecting the greater load as the load for the related attachment point.

29. The apparatus of claim 25, wherein the control system further determines when a load should be automatically jettisoned by:

(a) subtracting the load on one of the two attachment points from the load on the other of the two attachment points to determine a differential load;

(b) filtering the differential load to remove its steady-state component;

(c) comparing the filtered differential load to a second threshold value; and (d) producing a jettison command if the instantaneous value of the load and the average value of the load at either of the attachment points are both less than the first threshold value and if the filtered differential load is greater than the second threshold value.

30. The apparatus of claim 29, wherein the control system determines the second threshold value by:

(a) averaging the value of the load on each of the two attachment points over a period of time; and (b) taking a second percentage of the average value of the load on each of the two attachment points and doubling it to determine an expected change in differential load due to a failure of the suspension system.

31. The apparatus of claim 30, wherein the control system determines the first threshold value by:

(a) averaging the value of the load on each of the two attachment points over a period of time; and (b) taking a first percentage of the average value of the load on each of the two attachment points.

32. The apparatus of claim 31, wherein the first percentage is within the range of 10% to 30% and the second percentage is within the range of 50% to 100%.

33. The apparatus of claim 29, wherein the control system further determines when a load should be automatically jettisoned by:

(a) determining the mount that the load on each of the two attachment points decreased within a selected period of time;

(b) comparing the mount of decrease on each of the two attachment points with a third threshold value; and (c) producing a jettison command if the instantaneous value of the load and the average value of the load at either of the attachment points are both less than the first threshold value and if the filtered differential load is greater than the second threshold value and if the mount of decrease on either of the two attachment points is greater than the third threshold value.

34. The apparatus of claim 33, wherein the control system determines the first threshold value by:

(a) averaging the value of the load on each of the two attachment points over a period of time; and (b) taking a first percentage of the average value of the load on each of the two attachment points.

35. The apparatus of claim 34, wherein the control system determines the second threshold value by:

(a) averaging the value of the load on each of the two attachment points over a period of time; and (b) taking a second percentage of the average value of the load on each of the two attachment points and doubling it to determine an expected change in differential load due to a failure of the suspension system.

36. The apparatus of claim 35, wherein the control system determines the third threshold value by:

(a) averaging the value of the load on each of the two attachment points over a period of time; and (b) taking a third percentage of the average value of the load on each of the two attachment points.

37. The apparatus of claim 36, wherein the first percentage is within the range of 10% to 30% and the second percentage is within the range of 50% to 100% and the third percentage is within the range of 40% to 60%.

38. The apparatus of claim 33, wherein the selected period of time over which the control system measures the mount of decrease in the load on each attachment point is within the range of 0.05 to 0.15 seconds.

39. The apparatus of claim 25, wherein the control system further produces a jettison command if the load placed on either one of the two attachment points nears a structural limit of the attachment point.

* * * * *

UNITED STATES PATENT AND TRADEMARK OFFICE
CERTIFICATE OF CORRECTION

PATENT NO. : 5,499,785                                Page 1 of 2
DATED : March 19, 1996
INVENTOR(S) : J.P. Roberts et al.

It is certified that error appears in the above-indentified patent and that said Letters Patent is hereby corrected as shown below:

| COLUMN | LINE | |
|---|---|---|
| 3 | 42 | "mount" should read --amount-- |
| 5 | 7 | First occurrence of "act" should read --aft-- |
| 5 | 7 | Second occurrence of "act" should read --aft-- |
| 13 | 59 | "102*b*," should read --102b-- |
| 17 (Claim 16, line 3) | 35 | "avenging" should read --averaging-- |
| 20 (Claim 33, line 4) | 1 | "mount" should read --amount-- |
| 20 (Claim 33, line 7) | 4 | "mount" should read --amount-- |

UNITED STATES PATENT AND TRADEMARK OFFICE
CERTIFICATE OF CORRECTION

PATENT NO. : 5,499,785
DATED     : March 19, 1996
INVENTOR(S) : J.P. Roberts et al.

It is certified that error appears in the above-indentified patent and that said Letters Patent is hereby corrected as shown below:

Column 20, line 39, "mount" should read --amount--

Signed and Sealed this

Ninth Day of July, 1996

*Attest:*

BRUCE LEHMAN

*Attesting Officer*     *Commissioner of Patents and Trademarks*